(12) United States Patent
Woo-Dong

(10) Patent No.: US 6,509,576 B2
(45) Date of Patent: Jan. 21, 2003

(54) METHOD FOR COMPENSATING POSITION OF ROBOT USING LASER MEASURING INSTRUMENT

(75) Inventor: Hwang Woo-Dong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/905,797

(22) Filed: Jul. 13, 2001

(65) Prior Publication Data
US 2002/0038855 A1 Apr. 4, 2002

(30) Foreign Application Priority Data
Sep. 29, 2000 (KR) .............................. 00-57276

(51) Int. Cl.[7] .............................. B25J 9/00; B25J 19/04; G05B 19/00
(52) U.S. Cl. .................. 250/559.33; 901/3; 901/47; 700/259
(58) Field of Search ............................ 901/3, 16, 42, 901/47; 250/559.3, 559.33, 222.1; 356/614, 622; 700/251, 259, 559.21; 219/121.6

(56) References Cited
U.S. PATENT DOCUMENTS

| | | | | |
|---|---|---|---|---|
| 4,602,163 A | * | 7/1986 | Pryor | 250/161 |
| 4,969,108 A | * | 11/1990 | Webb et al. | 364/513 |
| 5,177,563 A | * | 1/1993 | Everett et al. | 356/375 |
| 5,371,836 A | * | 12/1994 | Mitomi et al. | 395/80 |
| 5,380,978 A | * | 1/1995 | Pryor | 219/121.64 |
| 5,608,847 A | * | 3/1997 | Pryor | 395/83 |

\* cited by examiner

Primary Examiner—Kevin Pyo
Assistant Examiner—David C. Meyer
(74) Attorney, Agent, or Firm—Christie, Parker & Hale, LLP

(57) ABSTRACT

Disclosed is a method for compensating the position of a robot using a laser measuring instrument by establishing an origin coordinate system; irradiating laser beams onto reflectors and calculating distances to the reflectors; converting the origin coordinate system to an established coordinate system; generating coordinates of an end of a lower tip of a welding gun; calculating a position and posture of the robot; teaching the robot four or more postures; uploading position coordinates of the robot and robot teaching program data to a main computer; determining if an error between CAD data and data modeled through simulation is less than a predetermined value, revising the data if it is not or completing compensation of positions of the welding gun, the robot and the jigs if it is; and downloading the robot teaching program to a robot controller.

2 Claims, 6 Drawing Sheets

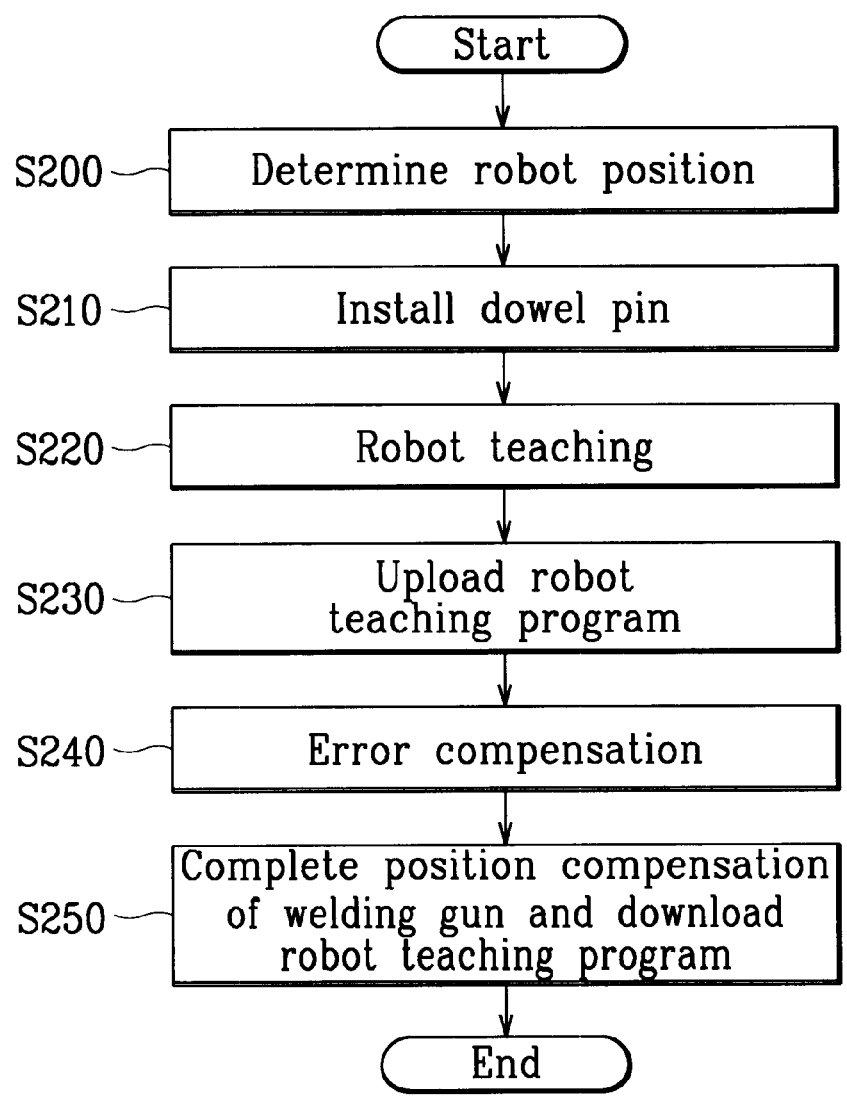

METHOD FOR COMPENSATING POSITION OF ROBOT USING LASER MEASURING INSTRUMENT

CROSS-REFERENCE TO RELATED APPLICATION

This application claims priority of Korea patent Application No. 2000-57276, filed on Sep. 29, 2000.

BACKGROUND OF THE INVENTION (a) Field of the Invention

The present invention relates to a method for compensating the position of a robot using a laser measuring instrument. More particularly, the present invention relates to a method for compensating the position of a robot in which a laser measuring instrument is used to simultaneously compensate for the positioning of a welding gun, a welding robot, various jigs, etc. such that a robot teaching process time is reduced and a precision of welding point teaching for a vehicle body panel robot is enhanced.

(b) Description of the Related Art

Computer simulations are commonly used in the design of assembly processes for automobiles. That is, using computer simulations, all the processes involved in manufacture-design, manufacture and installation of manufacturing processes and lines, and the operation of the processes can be modeled before actual application. Then by running the simulation, problems can be detected and rectified before actual implementation. Accordingly, the time to prepare for production is reduced, quality is enhanced and costs are minimized. In addition to these advantages, benefits are realized through the off-line programming capabilities of simulations.

However, since in the robot programs the modeling of the situations in which the robots are placed is based on CAD data with the use of simulations, exact replication of the true conditions is not possible. That is, there results a difference between the model and the actual situation such that direct application of the robots designed using the simulations is not possible. Accordingly, it is necessary to undergo a calibration process in which these differences in the programs written off-line (i.e., differences between the designed data and actual circumstances) is compensated for, after which the calibrated programs are downloaded to a robot controller.

Such calibration of the positions of a welding gun, welding robot, various jigs and other manufacturing machinery placed in a vehicle body assembly line is referred to as a robot position compensation method. The conventional robot position compensation method is divided into two sub-methods: a welding gun calibration method, in which the difference between CAD modeling data of a welding gun and information of an actual welding gun is compensated, and a layout calibration method, in which CAD modeling data of the positioning of robots and jigs and actual positioning of the robots and jigs is calibrated.

As an example of the welding gun calibration method, with reference to FIGS. 3 and 4, with a welding gun 53 mounted to an arm of a vehicle body panel welding robot 51, six axis joints of which are driven by a servo motor (not shown), production errors of the welding gun 53 and attachment errors of the robot 51 are compensated. In more detail, a needle pin 55, which has a sharp end and is made of steel, is first produced and is installed within a working radius of the robot 51 in step S100. Next, the user/operator teaches the robot 51 through a robot controller 61 such that that a lower tip 57 of the welding gun 53 is positioned at the end of the needle pin 55 in step S110.

Subsequently, in a state where the lower tip 57 of the welding gun 53 is positioned at the end of the needle pin 55, a reference point is designated and teaching of the robot 51 of at least four postures is performed in step S120. Next, teaching program data corresponding to the four or more positions is transmitted to a main computer 59 in step S130. At this time, the four or more positions of the robot 51 do not merge at a single point (i.e., the reference point) in the robot teaching program as a result of robot position errors (backlash). Accordingly, possibly four or more reference points result.

Following the above, the main computer 59 runs the uploaded robot teaching program, then compensates the four or more reference points to a single point in step S140. Next, an error between CAD data of a distance from a first axis at an end of the lower tip 57 of the welding gun 53 to a second axis, which is a connecting portion of the welding gun 53, and data modeled through a simulation is compared with a predetermined value. That is, in step S150, it is determined if the error between the CAD data and the simulation data is less than the predetermined value.

If the condition of step S150 is satisfied, position compensation of the welding gun 53 is completed, then the robot teaching program is downloaded to the robot controller 61 in step S160. However, if the condition of step S150 is not satisfied, welding gun data modeled through the simulation is revised in step S170, after which step S160 is performed, thereby completing the welding gun calibration method.

An example of the layout calibration method will now be described with reference to FIGS. 5 and 6. In a state where a welding gun 53 is mounted to an arm of a vehicle body panel welding robot 51, six axis joints which are driven by a servo motor (not shown), and jigs 65, which include a clamp, locator and a tooling pin for controlling a vehicle body panel 63, are installed according to car assembly line coordinates, errors in the positioning of the robot 51 and the jigs 65 are compensated. This will be described in more detail below.

First, a distance T1 is measured using a tape measure to determine a position of the robot 51 and a distance T2 is determined from a robot product drawing, after which a robot position is calculated in step S200. Next, a dowel pin 67, which is made of steel and has a sharp end is inserted in a NC hole to connect one jig 65 to another, is manufactured and installed in one of the jigs in step S210. The user/operator then teaches the robot 51 through a robot controller 61 such that that a lower tip 57 of the welding gun 53 is positioned at the end of the dowel pin 67. In this state, a reference point is designated and teaching of the robot 51 to at least four postures is performed in step S220.

Following the above, teaching program data corresponding to the four or more positions is transmitted to a main computer 59 in step S230. The main computer 59 then runs the uploaded robot teaching program, and considering the four or more reference points that do not merge at a single point, makes a comparison of data modeled through simulation such that robot position data are compensated to correspond to actual positions in step S240. Next, after position compensation of the welding gun 53 is completed, the robot teaching program is downloaded to the robot controller 61 in step S250, thereby concluding the layout calibration method.

However, in the conventional robot position compensation method as described above, manufacturing time is increased as a result of the method being divided into two sub-methods that are separately performed, that is the welding gun calibration method, in which the difference between CAD modeling data of the welding gun and information of the actual welding gun is compensated, and the layout calibration method, in which CAD modeling data of the positioning of robots and jigs and actual positioning of the robots and jigs is calibrated. Also, errors are common in the actual measuring of the robot position such that a second compensation procedure performed through operator teaching is required.

SUMMARY OF THE INVENTION

The present invention has been made in an effort to solve the above problems.

It is an object of the present invention to provide a method for compensating the position of a robot in which a laser measuring instrument is used to simultaneously compensate for the positioning of a welding gun, a welding robot, various jigs, etc. such that a robot teaching process time is reduced and a precision of welding point teaching for a vehicle body panel robot is enhanced.

To achieve the above object, the present invention provides a method for compensating the position of a robot using a laser measuring instrument. The method comprises the steps of (a) establishing an origin coordinate system by installing a reflector in each of a plurality of jig NC holes of a jig table, precise locations of which are known based on a car assembly line coordinate system, irradiating laser beams onto the reflectors by the laser measuring instrument and calculating distances to the reflectors based on properties of the laser beams reflected back to a sensor head of the laser measuring instrument, setting one of the NC holes of the jig table as an origin, with lines extending from the origin to two other NC holes as X and Y axes, and with a line normal to the plane formed by the three NC holes as a Z axis; (b) converting, in a controller of the laser measuring instrument, the origin coordinate system to an established coordinate system to enable the laser measuring instrument to recognize the origin coordinate system as a car assembly line coordinate system; (c) generating coordinates of an end of a lower tip of a welding gun by irradiating a laser beam onto a reflector installed on the end of the lower tip of the welding gun and calculating a distance to the reflector based on the properties of the laser beam reflected back to the sensor head of the laser measuring instrument; (d) calculating absolute coordinates of the end of the lower tip of the welding gun by using the coordinates determined in steps (a) and (c) to calculate a distance between the NC holes and the end of the lower tip of the welding gun, and calculating a position and posture of the robot using the absolute coordinates; (e) teaching the robot four or more postures by setting the end of the lower tip of the welding gun as a reference point; (f) uploading position coordinates of the robot calculated in step (d) and robot teaching program data of step (e) to a main computer; (g) performing error compensation by the main computer in which the main computer runs the uploaded robot teaching program and compensates the four or more points not converging at a single point so that the points merge at the reference point, which is at the end of lower tip of the welding gun, and compares the points with data modeled through simulation in consideration of the plurality of points of the jig so that the points are made to correspond to an actual position standard; (h) determining if an error between CAD data corresponding to the distance to the end of the lower tip of the welding gun and data modeled through simulation is less than a predetermined value; and (i) completing compensation, if the error between the CAD data of the distance to the end of the lower tip of the welding gun and the data modeled through simulation is less than the predetermined value, of positions of the welding gun, the robot and the jigs, and downloading the robot teaching program to a robot controller.

According to a feature of the present invention, in step (h), if the error between the CAD data of the distance to the end of the lower tip of the welding gun and the data modeled through simulation is greater than or equal to the predetermined value, welding gun data modeled through simulation is revised, then step (i) is performed.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 6 is a flow chart of a conventional robot and jig position compensating method.

DETAILED DESCRIPTION OF THE PREFERRED EMBODIMENTS

Preferred embodiments of the present invention will now be described in detail with reference to the accompanying drawings.

Figure 1:
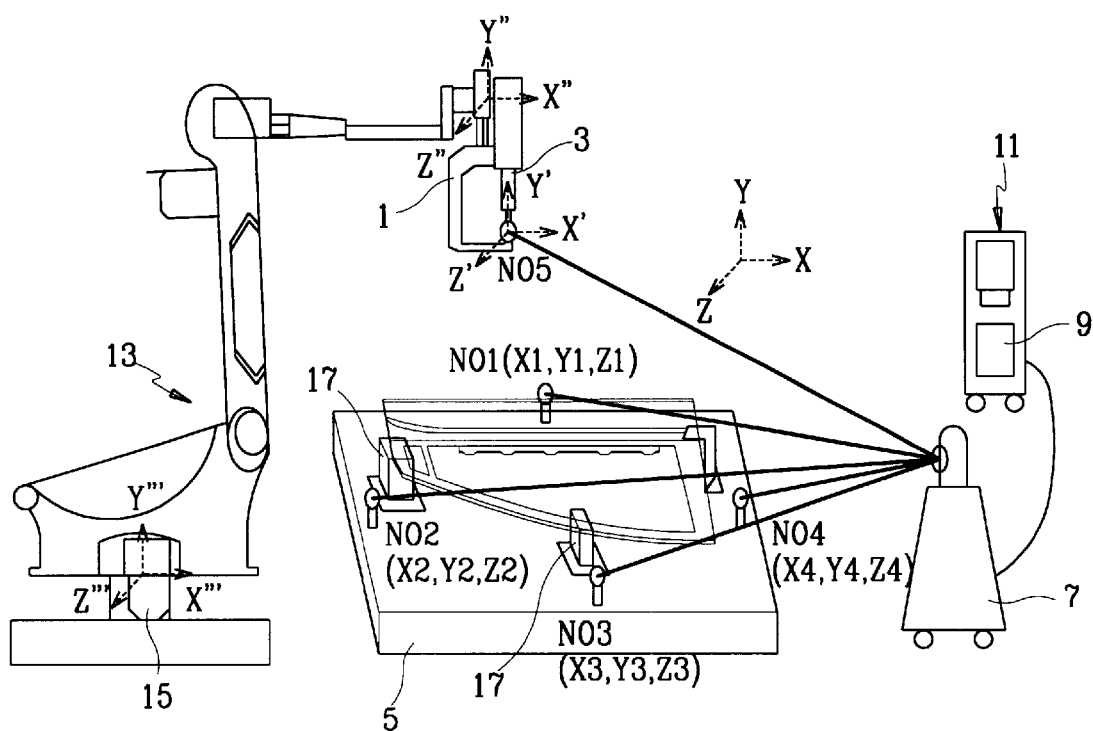
FIG. 1 is a schematic view of a robot position compensating system according to a preferred embodiment of the present invention.
Figure 2:
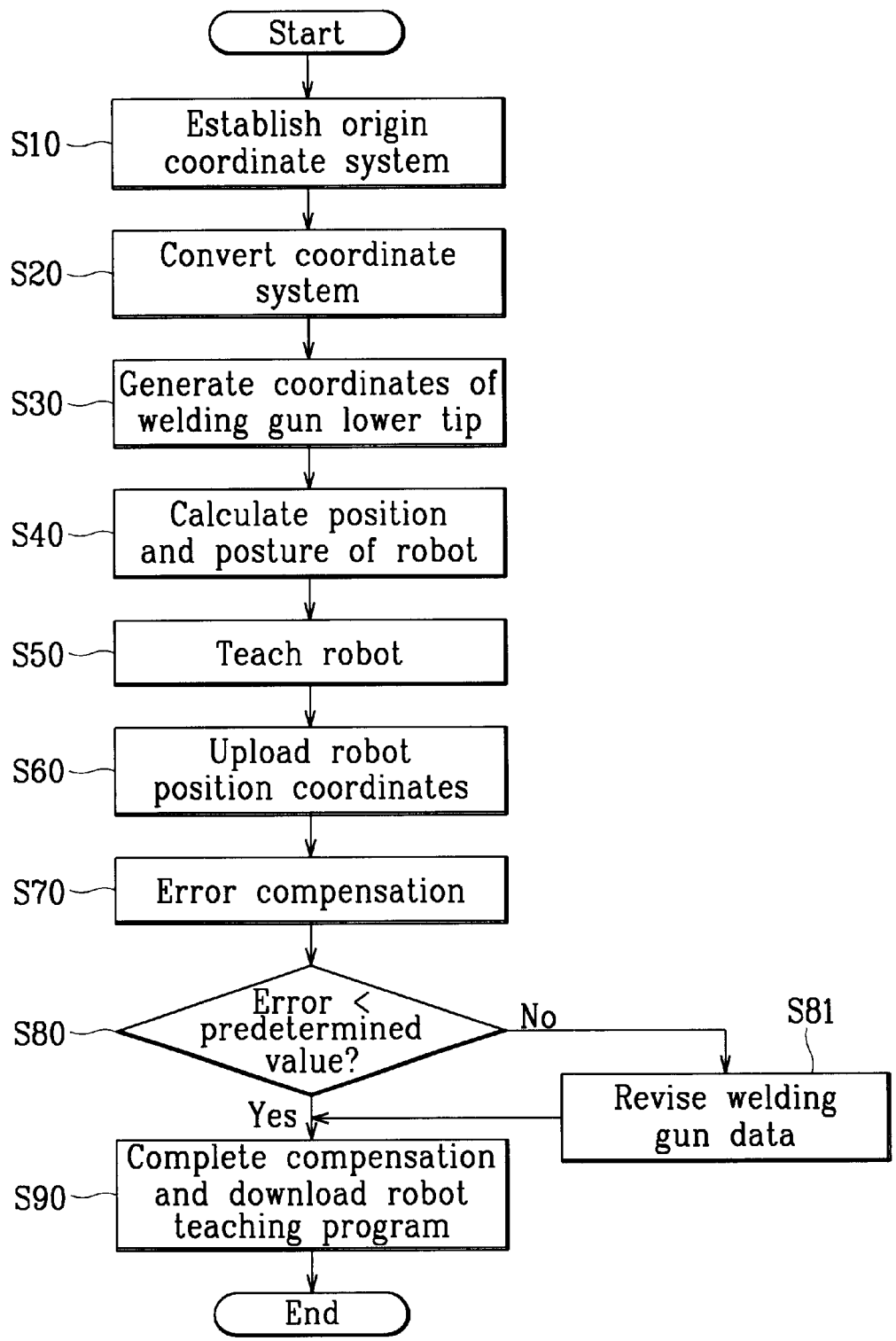
FIG. 2 is a flow chart of a robot position compensating method using a laser measuring instrument according to a preferred embodiment of the present invention.
Figure 3:
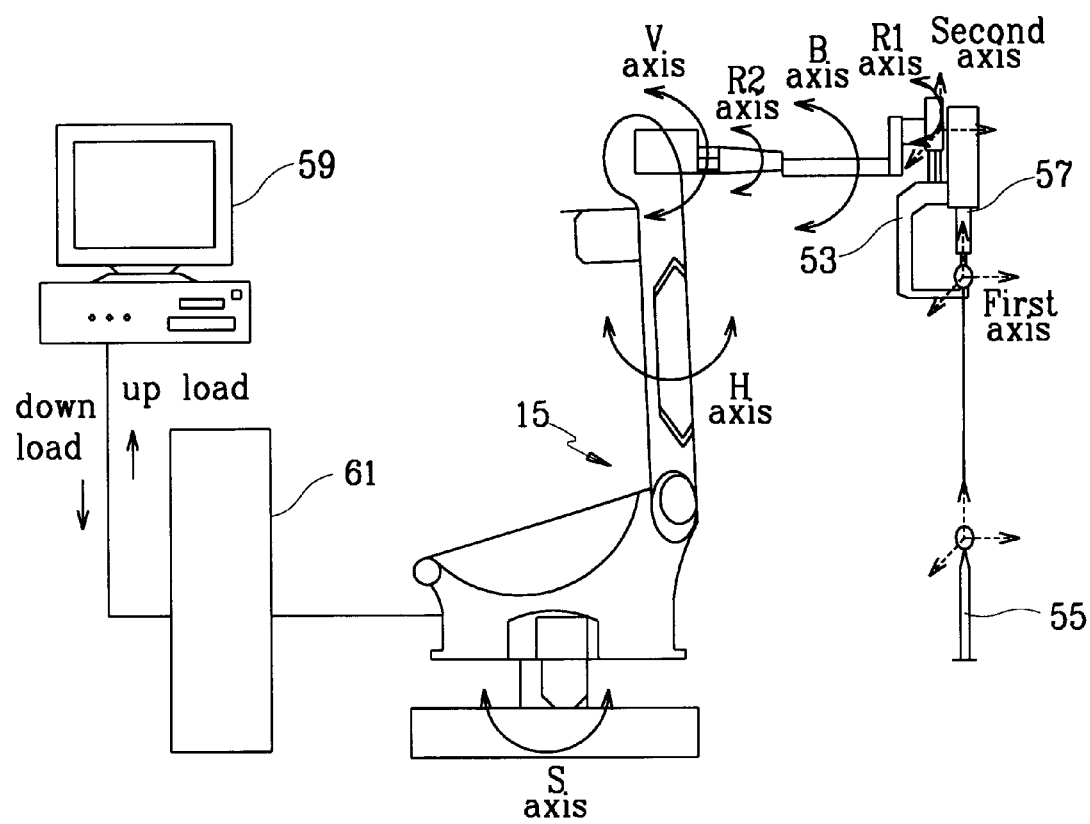
FIG. 3 is a schematic view of a conventional welding gun position compensating system.
Figure 4:
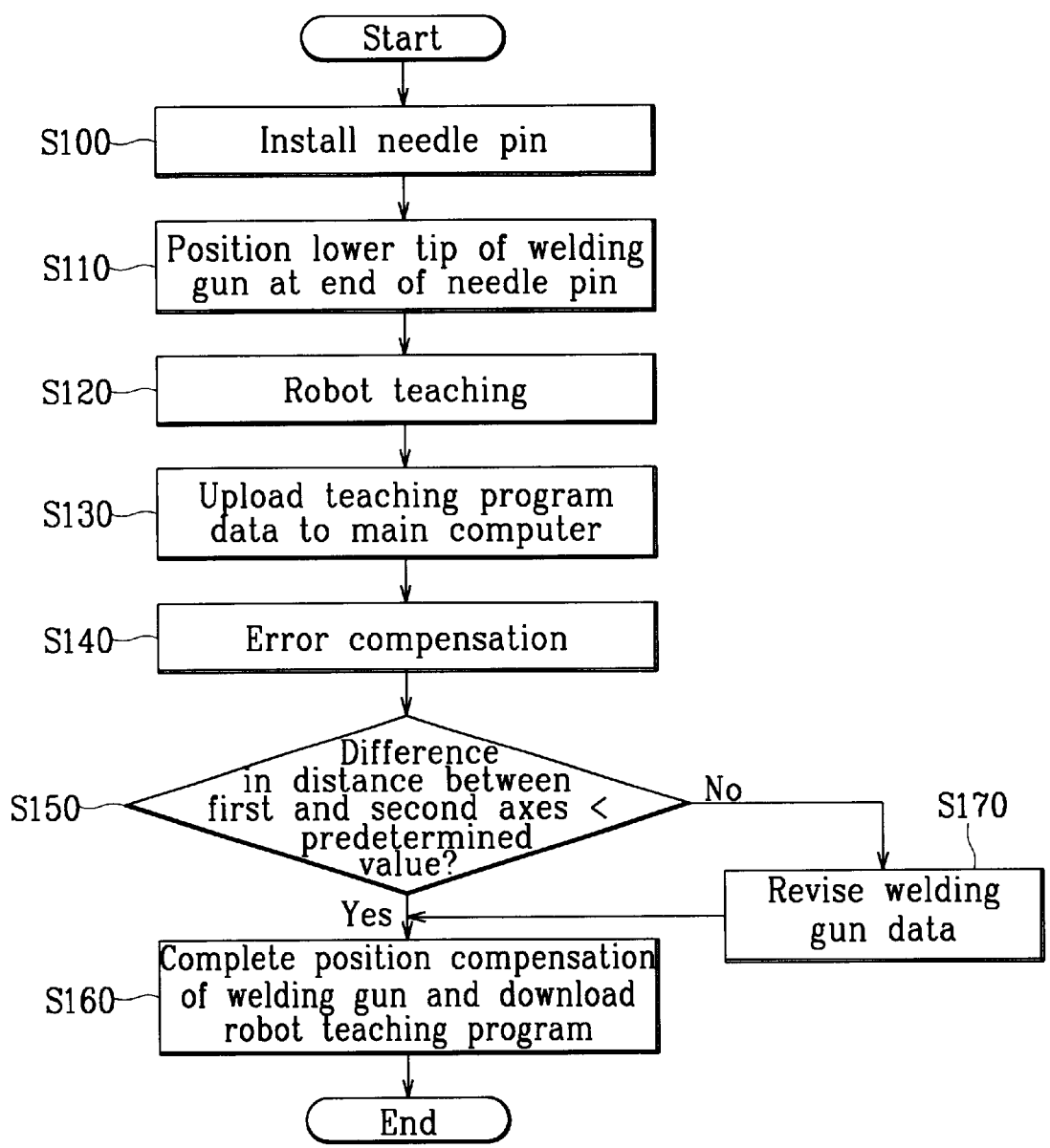
FIG. 4 is a flow chart of a conventional welding gun position compensating method.
Figure 5:
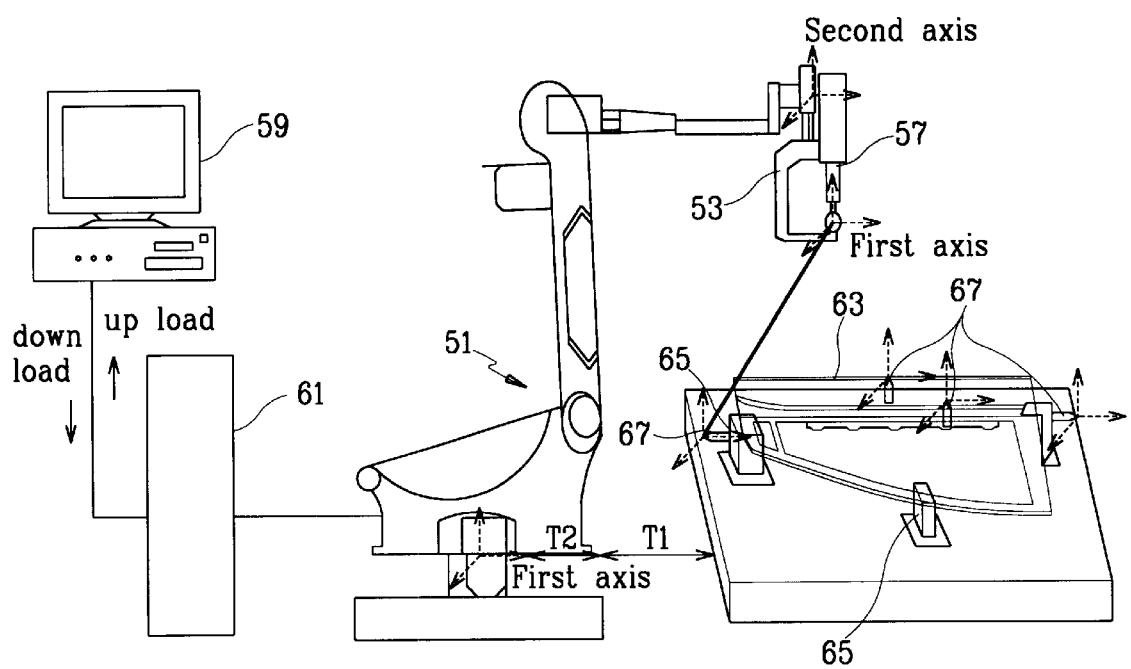
FIG. 5 is a schematic view of a conventional robot and jig position compensating system.

FIG. 1 shows a schematic view of a robot position compensating system according to a preferred embodiment of the present invention.

In the robot position compensating system, first, second, third and fourth reflectors NO1, NO2, NO3 and NO4 are installed in jig NC holes. The reflectors NO1, NO2, NO3 and NO4 are positioned according to a car assembly-line coordinate system. Also, a fifth reflector NO5 is installed to an end of a lower tip 3 of a welding gun 1. Further, a laser measuring instrument 7 is positioned to one side of a jig table 5. The laser measuring instrument 7 is connected to a main computer 11, which includes a controller 9.

In a robot position compensating method of the present invention applied to the robot position compensating system described above, laser beams are irradiated from the laser measuring instrument 7 in sequence onto the first, second, third and fourth reflectors NO1, NO2, NO3 and NO4, and distances to the reflectors NO1, NO2, NO3 and NO4 are calculated based on properties of the laser beams reflected back to a sensor head of the laser measuring instrument 7.

First, an origin coordinate system is established in step S10. That is, one of the NC holes of the jig table 5 is set as an origin (e.g., where the reflector NO1 is placed), and lines extending from the origin to two other NC holes (NO2 and NO3) are set as the X and Y axes. Also, a line normal to the plane formed by the three NC holes (NO1, NO2 and NO3) is set as the Z axis.

Next, the origin coordinate system generated in step S10 is converted to an established coordinate system in step S20. In particular, to enable the laser measuring instrument 7 to recognize the origin coordinate system of step S10 as a car assembly line coordinate system, the origin coordinate system (one of X1, Y1, Z1; X2, Y2, Z2; X3, Y3, Z3; or X4, Y4, Z4) is converted to an established coordinate system in the controller 9 of the laser measuring instrument 7.

Following the above, in a state where the fifth reflector NO5 is attached to the end of the lower tip 3 of the welding gun 1, a laser beam is irradiated onto the fifth reflector NO5 by the laser measuring instrument 7, and the distance to the fifth reflector NO5 is calculated based on the properties of the laser beam reflected back to the sensor head of the laser measuring instrument 7 such that the end of the lower tip 3 of the welding gun 1 is set as a first axis and coordinates (X', Y', Z') are generated in step S30.

Subsequently, using the coordinates (X, Y, Z and X', Y', Z') determined in steps S10 and S30, a distance between the NC holes and the end of the lower tip 3 of the welding gun 1, and absolute coordinates of the end of the lower tip 3 of the welding gun 1 are calculated. At the same time, coordinates (X''', Y''', Z''') are formed at a base axis 15 of the robot 13 (a third axis), and by calculating a position of the first axis (X', Y', Z') of the end of the lower tip 3 of the welding gun 1 with respect to the third axis, a position and posture of the welding robot 13 are determined in step S40.

The end of the lower tip 3 of the welding gun 1 is then set as a reference point, and teaching the robot 13 four or more postures is performed in step S50. Next, the position coordinate of the robot 13 determined in step S40 and teaching program data of step S50 are transmitted to the main computer 11 in step S60. That is, actual robot information is uploaded to the main computer in step S60.

Subsequently, the main computer 11 runs the uploaded robot teaching program, and compensates the four or more points not converging at a single point so that they merge at the reference point, which is at the end of lower tip 3 of the welding gun 1. Also, the points are compared with the data modeled through simulation in consideration of the plurality of points of the jig, and made to correspond to an actual position standard. These processes are performed in the error compensation step of step S70.

Following step S70, the main computer 11, using coordinates (X'', Y'', Z'') in which a connecting portion of the welding gun 1 is set as a second axis, compares an error between CAD data corresponding to the distance to the end of the lower tip 3 of the welding gun 1 and data modeled through simulation with a predetermined value in step S80. If the error between the CAD data of the distance to the end of the lower tip 3 of the welding gun 1 and the data modeled through simulation is less than the predetermined value, compensation of the positions of the welding gun 1, the robot 13 and the jigs 17 is completed, then the robot teaching program is downloaded to a robot controller in step S90, thereby completing the process.

However, in step S80, if the error between the CAD data of the distance to the end of the lower tip 3 of the welding gun 1 and the data modeled through simulation is greater than or equal to the predetermined value, welding gun data modeled through simulation is revised in step S81, after which step S90 is performed.

In the method for compensating the position of a robot using a laser measuring instrument of the present invention, the positions of the welding gun, welding robot and jigs in a vehicle body assembly line are simultaneously compensated such that the robot teaching process time is reduced and a precision of welding point teaching for a vehicle body panel robot is enhanced. Accordingly, the overall manufacture time is minimized and increased precision is obtained.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for compensating a position of a robot using a laser measuring instrument, the method comprising the steps of:

(a) establishing an origin coordinate system by installing a reflector in each of a plurality of jig NC holes of a jig table, precise locations of which are known based on a car assembly line coordinate system, irradiating laser beams onto the reflectors by the laser measuring instrument and calculating distances to the reflectors based on properties of the laser beams reflected back to a sensor head of the laser measuring instrument, setting one of the NC holes of the jig table as an origin, with lines extending from the origin to two other NC holes as X and Y axes, and with a line normal to the plane formed by the three NC holes as a Z axis;

(b) converting, in a controller of the laser measuring instrument, the origin coordinate system to an established coordinate system to enable the laser measuring instrument to recognize the origin coordinate system as a car assembly line coordinate system;

(c) generating coordinates of an end of a lower tip of a welding gun by irradiating a laser beam onto a reflector installed on the end of the lower tip of the welding gun and calculating a distance to the reflector based on the properties of the laser beam reflected back to the sensor head of the laser measuring instrument;

(d) calculating absolute coordinates of the end of the lower tip of the welding gun by using the coordinates determined in steps (a) and (c) to calculate a distance between the NC holes and the end of the lower tip of the welding gun, and calculating a position and posture of the robot using the absolute coordinates;

(e) teaching the robot four or more postures by setting the end of the lower tip of the welding gun as a reference point;

(f) uploading position coordinates of the robot calculated in step (d) and robot teaching program data of step (e) to a main computer;

(g) performing error compensation by the main computer in which the main computer runs the uploaded robot teaching program and compensates the four or more points not converging at a single point so that the points merge at the reference point, which is at the end of lower tip of the welding gun, and compares the points with data modeled through simulation in consideration of the plurality of points of the jig so that the points are made to correspond to an actual position standard;

(h) determining if an error between CAD data corresponding to the distance to the end of the lower tip of the welding gun and data modeled through simulation is less than a predetermined value; and (i) completing compensation, if the error between the CAD data of the distance to the end of the lower tip of the welding gun and the data modeled through simulation is less than the predetermined value, of positions of the welding gun, the robot and the jigs, and downloading the robot teaching program to a robot controller.

2. The method of claim 1 wherein in step (h), if the error between the CAD data of the distance to the end of the lower tip of the welding gun and the data modeled through simulation is greater than or equal to the predetermined value, welding gun data modeled through simulation is revised, then step (i) of claim 1 is performed.

* * * * *